(12) United States Patent
Rigali et al.

(10) Patent No.: US 12,345,280 B2
(45) Date of Patent: Jul. 1, 2025

(54) FLUID SYSTEM WITH MULTI-MODE TRANSFER VALVE

(71) Applicant: RTX Corporation, Farmington, CT (US)

(72) Inventors: Jeffrey R. Rigali, South Windsor, CT (US); Christopher T. Koetsch, East Longmeadow, MA (US); Ryan P. Susca, Windsor, CT (US); David C. Kiely, West Springfield, MA (US); Michael Voytovich, Madison, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/237,272

(22) Filed: Aug. 23, 2023

(65) Prior Publication Data

US 2025/0067284 A1    Feb. 27, 2025

(51) Int. Cl.
F15B 13/043    (2006.01)
F15B 21/02    (2006.01)

(52) U.S. Cl.
CPC ........... *F15B 13/043* (2013.01); *F15B 21/02* (2013.01)

(58) Field of Classification Search
CPC ...... F15B 2013/0412; F15B 2211/8752; F15B 2211/8757; B64C 13/42
See application file for complete search history.

(56) References Cited

U.S. PATENT DOCUMENTS

| 3,269,676 | A | * | 8/1966 | Hopkins | ................. | B64C 13/42 |
| | | | | | | 318/564 |
| 3,527,143 | A | * | 9/1970 | Hayter | ..................... | F15B 18/00 |
| | | | | | | 91/523 |
| 4,688,469 | A | * | 8/1987 | Durtschi | ................. | F15B 18/00 |
| | | | | | | 91/509 |
| 4,887,214 | A | | 12/1989 | Takats | | |
| 5,600,220 | A | * | 2/1997 | Thoraval | ................. | F15B 18/00 |
| | | | | | | 318/563 |
| 6,637,199 | B2 | * | 10/2003 | Spickard | ................. | F02C 9/285 |
| | | | | | | 91/509 |

(Continued)

FOREIGN PATENT DOCUMENTS

CN    116221232 A    6/2023

OTHER PUBLICATIONS

EP Search Report for EP Patent Application No. 24196307.3 dated Apr. 17, 2025.

*Primary Examiner* — Thomas E Lazo
(74) *Attorney, Agent, or Firm* — Getz Balich LLC (57) ABSTRACT

A fluid system is provided that includes a first actuator, a second actuator and a valve system. The valve system includes a first control valve, a second control valve and a transfer valve. During a first mode of operation, the transfer valve is configured to fluidly couple the first control valve to the first actuator and fluidly couple the second control valve to the second actuator, and the transfer valve is also configured to fluidly decouple the first control valve from the second actuator and fluidly decouple the second control valve from the first actuator. During a second mode of operation, the transfer valve is configured to fluidly couple the first control valve to the first actuator and the second actuator, and the transfer valve is also configured to fluidly decouple the second control valve from the first actuator and the second actuator.

17 Claims, 4 Drawing Sheets

(56) References Cited

U.S. PATENT DOCUMENTS

| | | | |
|---|---|---|---|
| 7,175,133 B2 * | 2/2007 | Tanaka | B64C 13/505 |
| | | | 60/403 |
| 7,837,001 B2 | 11/2010 | Young | |
| 8,418,955 B2 | 4/2013 | Recksiek | |
| 9,657,756 B2 | 5/2017 | Bostiga | |
| 10,393,285 B2 | 8/2019 | Amari | |
| 11,391,384 B2 * | 7/2022 | DeFusco | F16K 31/082 |
| 12,024,306 B2 * | 7/2024 | Susca | G05D 16/2022 |
| 2018/0002028 A1 * | 1/2018 | Polcuch | F15B 11/205 |
| 2022/0372967 A1 | 11/2022 | Susca | |

* cited by examiner

FLUID SYSTEM WITH MULTI-MODE TRANSFER VALVE

BACKGROUND OF THE DISCLOSURE

1. Technical Field

This disclosure relates generally to a fluid system and, more particularly, to backup modes of operation for the fluid system.

2. Background Information

A fluid system for an aircraft may include multiple fluid actuators, where each fluid actuator is controlled by a respective electrohydraulic servo valve (EHSV). Each fluid actuator may also be selectively controllable by a respective backup electrohydraulic servo valve. Each fluid actuator may thereby be associated with two different electrohydraulic servo valves. While such a fluid system has various benefits, there is still room in the art for improvement.

SUMMARY OF THE DISCLOSURE

According to an aspect of the present disclosure, a fluid system is provided that includes a first actuator, a second actuator and a valve system. The valve system includes a first control valve, a second control valve and a transfer valve. During a first mode of operation, the transfer valve is configured to fluidly couple the first control valve to the first actuator and fluidly couple the second control valve to the second actuator, and the transfer valve is also configured to fluidly decouple the first control valve from the second actuator and fluidly decouple the second control valve from the first actuator. During a second mode of operation, the transfer valve is configured to fluidly couple the first control valve to the first actuator and the second actuator, and the transfer valve is also configured to fluidly decouple the second control valve from the first actuator and the second actuator.

According to another aspect of the present disclosure, another fluid system is provided that includes a first actuator and a valve system. The valve system includes a first control valve, a second control valve and a transfer valve. The transfer valve includes a first station first passage and a second station first passage. A minimum flow area of the first station first passage is less than a minimum flow area of the second station first passage. During a first mode of operation, the transfer valve is configured to fluidly couple the first control valve to the first actuator through the first station first passage. During a second mode of operation, the transfer valve is configured to fluidly couple the second control valve to the first actuator through the second station first passage. The second control valve is fluidly decoupled from the first actuator during the first mode of operation. The first control valve is fluidly decoupled from the first actuator during the second mode of operation.

According to still another aspect of the present disclosure, an operating method is provided. During a first mode, a first control valve is fluidly coupled to a first actuator through a transfer valve, and a second control valve is fluidly coupled to a second actuator through the transfer valve. During a second mode, the first control valve is fluidly coupled to the first actuator and the second actuator through the transfer valve, and the second control valve is fluidly decoupled from the second actuator.

The operating method may also include: selecting the first mode when the first control valve and the second control valve are each fully operational; and selecting the second mode when a fault is detected associated with the second control valve.

Flow through the transfer valve from the first control valve to the first actuator may be restricted during the first mode. The flow through the transfer valve from the first control valve to the first actuator may be unrestricted during the second mode.

The first control valve and the second control valve may each be configured as an electrohydraulic servo valve.

The operating method may include moving a component of an aircraft using the first actuator and the second actuator during the first mode and/or the second mode.

The fluid system may also include a second actuator. The transfer valve may also include a first station second passage and a second station second passage, wherein a minimum flow area of the first station second passage may be less than a minimum flow area of the second station second passage. During the first mode of operation, the transfer valve may be configured to fluidly couple the second control valve to the second actuator through the first station second passage. During the second mode of operation, the transfer valve may be configured to fluidly couple the second control valve to the second actuator through the second station second passage. The first control valve may be fluidly decoupled from the second actuator during the first mode of operation and the second mode of operation.

During a third mode of operation, the transfer valve may be configured to: fluidly couple the first control valve to the first actuator and the second actuator; and fluidly decouple the second control valve from the first actuator and the second actuator.

During a third mode of operation, the transfer valve may be configured to fluidly couple the second control valve to the first actuator and the second actuator, and the transfer valve may also be configured to fluidly decouple the first control valve from the first actuator and the second actuator.

The first actuator may be configured as or otherwise include a first piston actuator. The second actuator may also or alternatively be configured as or otherwise include a second piston actuator.

The first control valve may be configured as or otherwise include a first electrohydraulic servo valve. The second control valve may also or alternatively be configured as or otherwise include a second electrohydraulic servo valve.

A first station first passage in the transfer valve may have a minimum flow area, and the first station first passage may fluidly couple the first control valve to the first actuator during the first mode of operation. A second station first passage in the transfer valve may have a minimum flow area that is greater than the minimum flow area of the first station first passage, and the second station first passage may fluidly couple the first control valve to the first actuator during the second mode of operation.

The minimum flow area of the second station first passage may be equal to or greater than 1.25 times the minimum flow area of the first station first passage.

A first station second passage in the transfer valve may have a minimum flow area, and the first station second passage may fluidly couple the second control valve to the second actuator during the first mode of operation. A second station second passage in the transfer valve may have a minimum flow area that is greater than the minimum flow area of the first station second passage, and the second station second passage may fluidly couple the first control valve to the second actuator during the second mode of operation.

The minimum flow area of the first station second passage may be equal to the minimum flow area of the first station first passage. In addition or alternatively, the minimum flow area of the second station second passage may be equal to the minimum flow area of the second station first passage.

The first actuator may include a first inlet/outlet orifice and a second inlet/outlet orifice. The transfer valve may be configured to discretely fluidly couple the first inlet/outlet orifice and the second inlet/outlet orifice to the first control valve during the first mode of operation and the second mode of operation.

The second actuator may include a first inlet/outlet orifice and a second inlet/outlet orifice. The transfer valve may be configured to discretely fluidly couple the first inlet/outlet orifice and the second inlet/outlet orifice to the second control valve during the first mode of operation. The transfer valve may be configured to discretely fluidly couple the first inlet/outlet orifice and the second inlet/outlet orifice to the first control valve during the second mode of operation.

The fluid system may also include a fluid source. The valve system may fluidly couple the fluid source to the first actuator and the second actuator.

The fluid system may also include an aircraft component. The first actuator and the second actuator may be operatively coupled to and configured to move the aircraft component.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
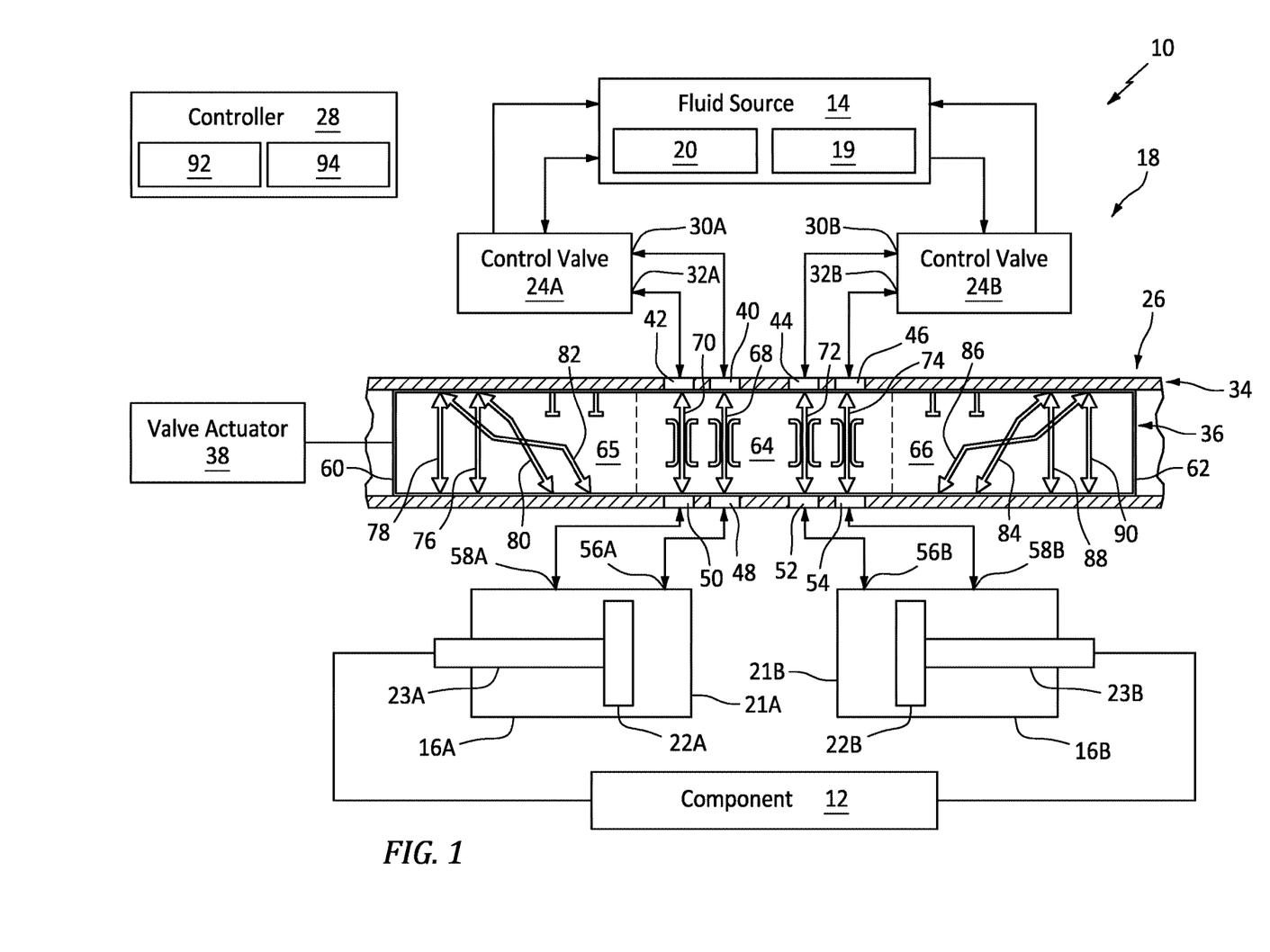
FIGS. 1-3 are schematic illustrations of a fluid system with a transfer valve operating in various modes of operation.

FIG. 1 illustrates a fluid system 10 for an aircraft. The aircraft may be an airplane, a helicopter, a drone (e.g., an unmanned aerial vehicle (UAV)) or any other manned or unmanned aerial vehicle or system. The fluid system 10 of the present disclosure, however, is not limited to aircraft applications. The fluid system 10, for example, may alternatively be configured for a land vehicle, an aquatic vehicle or any other mobile device or system. Moreover, the fluid system 10 may alternatively be configured for a stationary device or system. The fluid system 10 of FIG. 1 includes a moveable component 12, a fluid source 14, one or more fluid actuators 16A and 16B (generally referred to as "16") and a valve system 18.

The moveable component 12 of FIG. 1 is a moveable component of the aircraft. This moveable component 12 may be a component of an airframe of the aircraft. The moveable component 12, for example, may be configured as an aircraft control surface; e.g., a flap, a rudder, an elevator, a tab, a spoiler, an aileron, etc. Alternatively, the moveable component 12 may be a component of a propulsion system for the aircraft. The moveable component 12, for example, may be configured as a translating sleeve for a thrust reverser, a variable nozzle structure, etc.

The fluid source 14 of FIG. 1 includes a fluid reservoir 19 and a fluid flow regulator 20. The reservoir 19 is configured to store a quantity of fluid (e.g., hydraulic fluid, oil, etc.) before, during and/or after fluid system operation. The reservoir 19, for example, may be configured as or otherwise include a tank, a cylinder, a pressure vessel, a bladder or any other type of fluid (e.g., liquid) storage container. The flow regulator 20 is configured to direct a flow of the fluid from the reservoir 19 to the fluid actuators 16 through the valve system 18. The flow regulator 20, for example, may be configured as or otherwise include a pump.

Each fluid actuator 16 of FIG. 1 is operatively coupled to and configured to pivot, translate, shift and/or otherwise move the moveable component 12. Each fluid actuator 16, for example, may be configured as a linear actuator such as a hydraulic piston. Each fluid actuator 16A, 16B of FIG. 1, in particular, includes a cylinder 21A, 21B (generally referred to as "21"), a piston 22A, 22B (generally referred to as "22") and an arm 23A, 23B (generally referred to as "23"). The piston 22 is arranged within an internal cavity of the cylinder 21. The arm 23 is attached to the piston 22 and projects out from the cylinder 21. A distal end of the arm 23 is directly or indirectly operatively coupled to the moveable component 12. The cylinder 21 is coupled to a base structure; e.g., a stationary structure. With this arrangement, by increasing and/or decreasing fluid volume and/or pressure to one or both sides of the piston 22 within the internal cavity, each fluid actuator 16 may move the moveable component 12 by extending its actuator arm 23 out from the cylinder 21 or retracting its actuator arm 23 into the cylinder 21. The present disclosure, however, is not limited to such an exemplary type of fluid actuators. One or more of the fluid actuators 16, for example, may alternatively be configured as a fluid motor. Moreover, while the fluid actuators 16 of FIG. 1 are associated with a common (the same) moveable component 12, it is contemplated the fluid actuators 16 may alternatively be operatively coupled to and configured to move discrete (e.g., similarly situated) moveable components.

Referring again to FIG. 1, the valve system 18 is configured to control a flow of the fluid from the fluid source 14 to and/or from each of the fluid actuators 16. The valve system 18 of FIG. 1, for example, includes one or more control valves 24A and 24B (generally referred to as "24"), a transfer valve 26 (e.g., a switching valve) and a controller 28.

Each control valve 24 may be configured as an electro-hydraulic servo valve (EHSV). Each control valve 24A, 24B of FIG. 1 includes one or more input and/or output (I/O) ports 30A, 30B (generally referred to as "30"), 32A, 32B (generally referred to as "32"). Each control valve 24 is configured to control (e.g., selectively meter) fluid flow therethrough between each of its I/O ports 30 and 32 and a respective feed from or return to the fluid source 14. For example, where the valve system 18 is operated to extend the actuator arms 23, each control valve 24 directs fluid received from the fluid source 14 to its first I/O port 30, and each control valve 24 directs fluid received at its second I/O port 32 back to the fluid source 14. Here, the first I/O port 30 is configured as a feed port to the transfer valve 26, and the second I/O port 32 is configured as a return port from the transfer valve 26. In another example, where the valve system 18 is operated to retract the actuator arms 23, each control valve 24 directs fluid received from the fluid source 14 to its second I/O port 32, and each control valve 24 directs fluid received at its first I/O port 30 back to the fluid source 14. Here, the second I/O port 32 is configured as a feed port to the transfer valve 26, and the first I/O port 30 is configured as a return port from the transfer valve 26.

The transfer valve 26 includes a valve housing 34 and a valve body 36. The transfer valve 26 of FIG. 1 also includes a valve actuator 38 operatively coupled to the valve body 36.

The valve housing 34 includes one or more first control valve ports 40 and 42 ("first valve ports"), one or more second control valve ports 44 and 46 ("second valve ports"), one or more first fluid actuator ports 48 and 50 ("first actuator ports") and one or more second fluid actuator ports 52 and 54 ("second actuator ports"). The first valve ports 40 and 42 are respectively fluidly coupled to the I/O ports 30A and 32A of the first control valve 24A. The second valve ports 44 and 46 are respectively fluidly coupled to the I/O ports 30B and 32B of the second control valve 24B. The first actuator ports 48 and 50 are respectively fluidly coupled to input and/or output (I/O) ports 56A and 58A of the first fluid actuator 16A. The second actuator ports 52 and 54 are respectively fluidly coupled to input and/or output (I/O) ports 56B and 58B of the second fluid actuator 16B.

The valve body 36 of FIG. 1 extends longitudinally along a centerline between a first end 60 of the valve body 36 and a second end 62 of the valve body 36. This centerline may be a longitudinal centerline of the valve housing 34 and/or the valve body 36. The valve body 36 includes a plurality of valve stations 64-66 arranged longitudinally along the centerline. The intermediate station 64 is disposed longitudinally between the first end valve station 65 and the second end valve station 66. The first end valve station 65 is disposed at (e.g., on, adjacent or proximate) the body first end 60. The second end valve station 66 is disposed at the body second end 62. These valve stations 64-66 are configured as discrete, interconnected longitudinally extending segments of the valve body 36.

The intermediate station 64 includes one or more first fluid actuator passages 68 and 70 ("first actuator passages") and one or more second fluid actuator passages 72 and 74 ("second actuator passages"). Each first actuator passage 68, 70 extends longitudinally along a centerline of that first actuator passage 68, 70 from a valve side orifice of the respective first actuator passage 68, 70 to an actuator side orifice of the respective first actuator passage 68, 70. Each second actuator passage 72, 74 extends longitudinally along a centerline of that second actuator passage 72, 74 from a valve side orifice of the respective second actuator passage 72, 74 to an actuator side orifice of the respective second actuator passage 72, 74. With this arrangement, the intermediate station passages 68, 70, 72 and 74 of FIG. 1 are fluidly discrete from one another within the valve body 36.

Each of the intermediate station passages 68, 70, 72 and 74 has a minimum flow area, which is measured perpendicular to the respective centerline of that intermediate station passage 68, 70, 72, 74. This minimum flow area may extend along an entire length of the respective intermediate station passage 68, 70, 72, 74. Alternatively, the minimum flow area may be formed by a pinch point (e.g., a metering orifice) along the respective intermediate station passage 68, 70, 72, 74. The minimum flow areas of the first actuator passages 68 and 70 may be equal. The minimum flow areas of the second actuator passages 72 and 74 may be equal. The minimum flow area of one or both of the first actuator passages 68 and 70 may be equal to the minimum flow area of one or both of the second actuator passages 72 and 74. The present disclosure, however, is not limited to such an exemplary dimensional relationship between the intermediate station passages 68, 70, 72 and 74.

The first end valve station 65 includes one or more first fluid actuator passages 76 and 78 ("first actuator passages") and one or more second fluid actuator passages 80 and 82 ("second actuator passages"). Each first actuator passage 76 and 78 extends longitudinally along a centerline of that first actuator passage 76, 78 from a valve side orifice for the respective first actuator passage 76, 78 to an actuator side orifice of the respective first actuator passage 76, 78. Each second actuator passage 80, 82 extends longitudinally along a centerline of that second actuator passage 80, 82 from the valve side orifice for the respective second actuator passage 80, 82 to an actuator side orifice of the respective second actuator passage 80, 82. Thus, the first actuator passage 76 and the second actuator passage 80 each extend to (or may be otherwise fluidly coupled with) the same respective valve side orifice. Similarly, the first actuator passage 78 and the second actuator passage 82 each extend to (or may be otherwise fluidly coupled with) the same respective valve side orifice. With this arrangement, the first end station passages 76 and 80 of FIG. 1 are fluidly interconnected within the valve body 36, and the first end station passages 78 and 82 of FIG. 1 are fluidly interconnected within the valve body 36.

Each of the first end station passages 76, 78, 80 and 82 has a minimum flow area, which is measured perpendicular to the respective centerline of that first end station passage 76, 78, 80, 82. This minimum flow area may extend along an entire length of the respective first end station passage 76, 78, 80, 82. Alternatively, the minimum flow area may be formed by a pinch point (e.g., a metering orifice) along the respective first end station passage 76, 78, 80, 82. The minimum flow areas of the first actuator passages 76 and 78 may be equal. The minimum flow areas of the second actuator passages 80 and 82 may be equal. The minimum flow area of one or both of the first actuator passages 76 and 78 may be equal to the minimum flow area of one or both of the second actuator passages 80 and 82. However, the minimum flow area of each first end station passage 76, 78, 80 and 82 may be greater than the minimum flow area of each intermediate station passage 68, 70, 72 and 74. For example, the minimum flow area of each first end station passage 76, 78, 80, 82 may be between 1.25 times (1.25×) or 2.5 times (2.5×) (e.g., about 1.5 times (1.5×)) greater than the minimum flow area of the respective intermediate station passage 68, 70, 72, 74. With this arrangement, flow through the intermediate station passages 68, 70, 72 and 74 is restricted compared to flow through the first end station passages 76, 78, 80 and 82. The present disclosure, however, is not limited to such an exemplary dimensional relationship between the first end station passages 76, 78, 80 and 82, nor between the first end station passages 76, 78, 80 and 82 and the intermediate station passages 68, 70, 72 and 74. For example, the minimum flow area of each first end station passage 76, 78, 80, 82 and the minimum flow area of the respective intermediate station passage 68, 70, 72, 74 may be selected with any values which provide the system performance described below in further detail.

The second end valve station 66 includes one or more first fluid actuator passages 84 and 86 ("first actuator passages") and one or more second fluid actuator passages 88 and 90 ("second actuator passages"). Each first actuator passage 84, 86 extends longitudinally along a centerline of that first actuator passage 84, 86 from a valve side orifice for the respective first actuator passage 84, 86 to an actuator side orifice of the respective first actuator passage 84, 86. Each second actuator passage 88, 90 extends longitudinally along a centerline of that second actuator passage 88, 90 from the valve side orifice for the respective second actuator passage 88, 90 to an actuator side orifice of the respective second actuator passage 88, 90. Thus, the first actuator passage 84 and the second actuator passage 88 each extend to (or may be otherwise fluidly coupled with) the respective valve side orifice. Similarly, the first actuator passage 86 and the second actuator passage 90 each extend to (or may be otherwise fluidly coupled with) the respective valve side orifice. With this arrangement, the second end station passages 84 and 88 of FIG. 1 are fluidly interconnected within the valve body 36, and the second end station passages 86 and 90 of FIG. 1 are fluidly interconnected within the valve body 36.

Each of the second end station passages 84, 86, 88 and 90 has a minimum flow area, which is measured perpendicular to the respective centerline of that second end station passage 84, 86, 88, 90. This minimum flow area may extend along an entire length of the respective second end station passage 84, 86, 88, 90. Alternatively, the minimum flow area may be formed by a pinch point (e.g., a metering orifice) along the respective second end station passage 84, 86, 88, 90. The minimum flow areas of the first actuator passages 84 and 86 may be equal. The minimum flow areas of the second actuator passages 88 and 90 may be equal. The minimum flow area of one or both of the first actuator passages 84 and 86 may be equal to the minimum flow area of one or both of the second actuator passages 88 and 90. The minimum flow areas of the second end station passages 84, 86, 88 and 90 may also be equal to the minimum flow areas of the first end station passages 76, 78, 80 and 82. However, the minimum flow area of each second end station passage 84, 86, 88, 90 may be greater than the minimum flow area of each intermediate station passage 68, 70, 72, 74. For example, the minimum flow area of each second end station passage 84, 86, 88, 90 may be between 1.25 times (1.25×) or 2.5 times (2.5×) (e.g., about 1.5 times (1.5×)) greater than the minimum flow area of the respective intermediate station passage 68, 70, 72, 74. With this arrangement, flow through the intermediate station passages 68, 70, 72 and 74 is restricted compared to flow through the second end station passages 84, 86, 88 and 90. The present disclosure, however, is not limited to such an exemplary dimensional relationship between the second end station passages 84, 86, 88 and 90, between the second end station passages 84, 86, 88 and 90 and the first end station passages 76, 78, 80 and 82, nor between the second end station passages 84, 86, 88 and 90 and the intermediate station passages 68, 70, 72 and 74. For example, the minimum flow area of each second end station passage 84, 86, 88, 90 and the minimum flow area of the respective intermediate station passage 68, 70, 72, 74 may be selected with any values which provide the system performance described below in further detail.

The valve body 36 of FIG. 1 is disposed within an internal cavity of the valve housing 34. The valve body 36 is configured for move (e.g., translate) within the valve housing 34 and its internal cavity between a plurality of positions. These positions include an intermediate position (see FIG. 1), a first end position (see FIG. 2) and a second end position (see FIG. 3).

When the valve body 36 is in the intermediate position of FIG. 1, the transfer valve 26 fluidly couples the first control valve 24A to the first fluid actuator 16A, and the transfer valve 26 fluidly couples the second control valve 24B to the second fluid actuator 16B. Here, the first control valve 24A is fluidly decoupled from the second fluid actuator 16B, and the second control valve 24B is fluidly decoupled from the first fluid actuator 16A. More particularly, each first actuator passage 68, 70 in the intermediate station 64 is disposed between, aligned with and fluidly coupled to a respective one of the first valve ports 40 and 42 and a respective one of the first actuator ports 48 and 50. The first control valve 24A may thereby control (e.g., regulate) fluid flow to and/or from and is dedicated to operation of the first fluid actuator 16A. Each second actuator passage 72, 74 in the intermediate station 64 is disposed between, aligned with and fluidly coupled to a respective one of the second valve ports 44 and 46 and a respective one of the second actuator ports 52 and 54. The second control valve 24B may thereby control (e.g., regulate) fluid flow to and/or from and is dedicated to operation of the second fluid actuator 16B.

Figure 2:
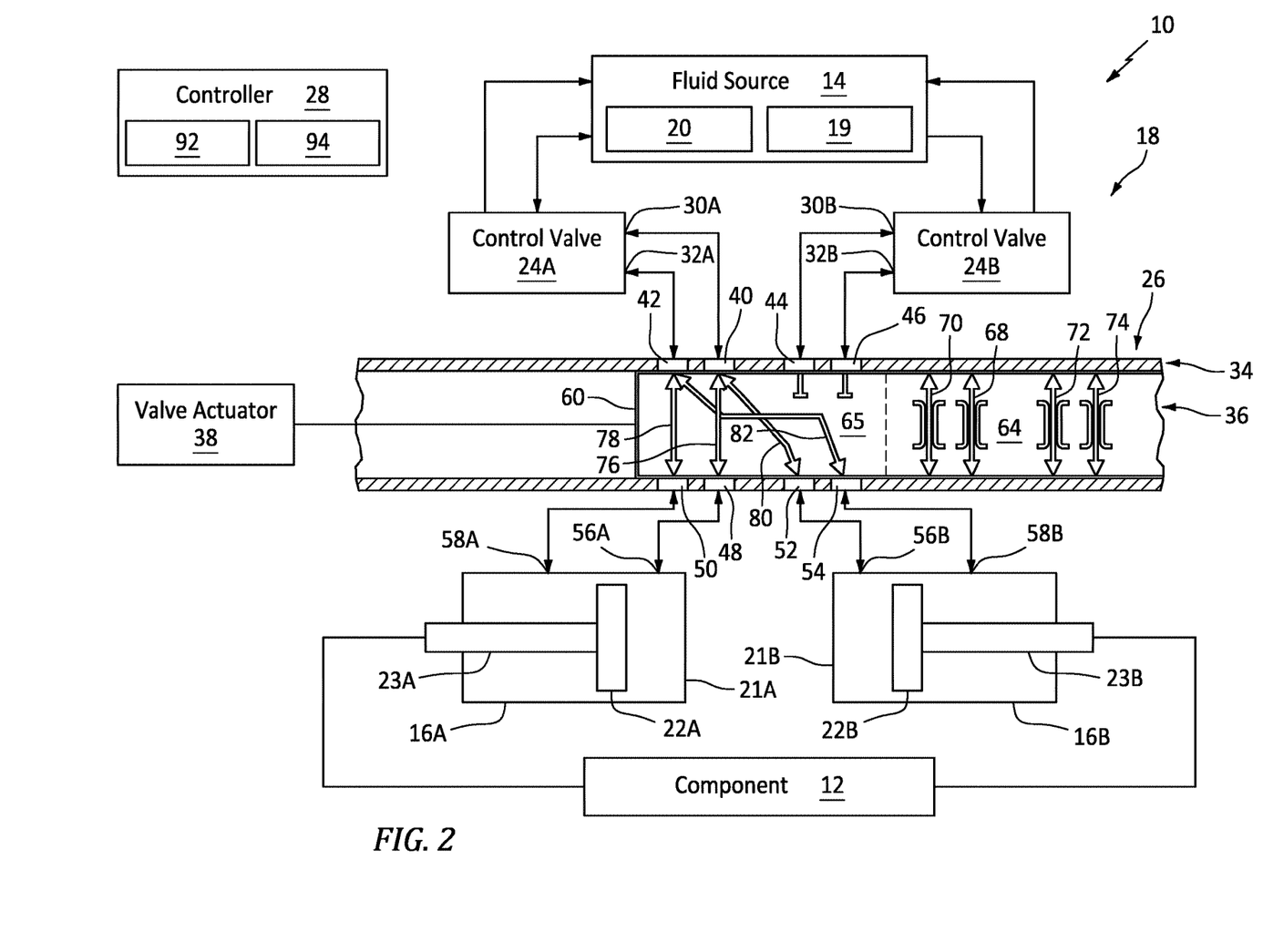

When the valve body 36 is in the first end position of FIG. 2, the transfer valve 26 fluidly couples the first control valve 24A to both the first fluid actuator 16A and the second fluid actuator 16B. Here, the second control valve 24B is fluidly decoupled from both the first fluid actuator 16A and the second fluid actuator 16B. More particularly, each first actuator passage 76, 78 in the first end station 65 is disposed between, may be aligned with and is fluidly coupled to a respective one of the first valve ports 40 and 42 and a respective one of the first actuator ports 48 and 50. Each second actuator passage 80, 82 in the first end station 65 is disposed between, may be aligned with and is fluidly coupled to a respective one of the first valve ports 40 and 42 and a respective one of the second actuator ports 52 and 54. The first control valve 24A may thereby control (e.g., regulate) fluid flow to and/or from and is dedicated to operation of both the first fluid actuator 16A and the second fluid actuator 16B.

Figure 3:
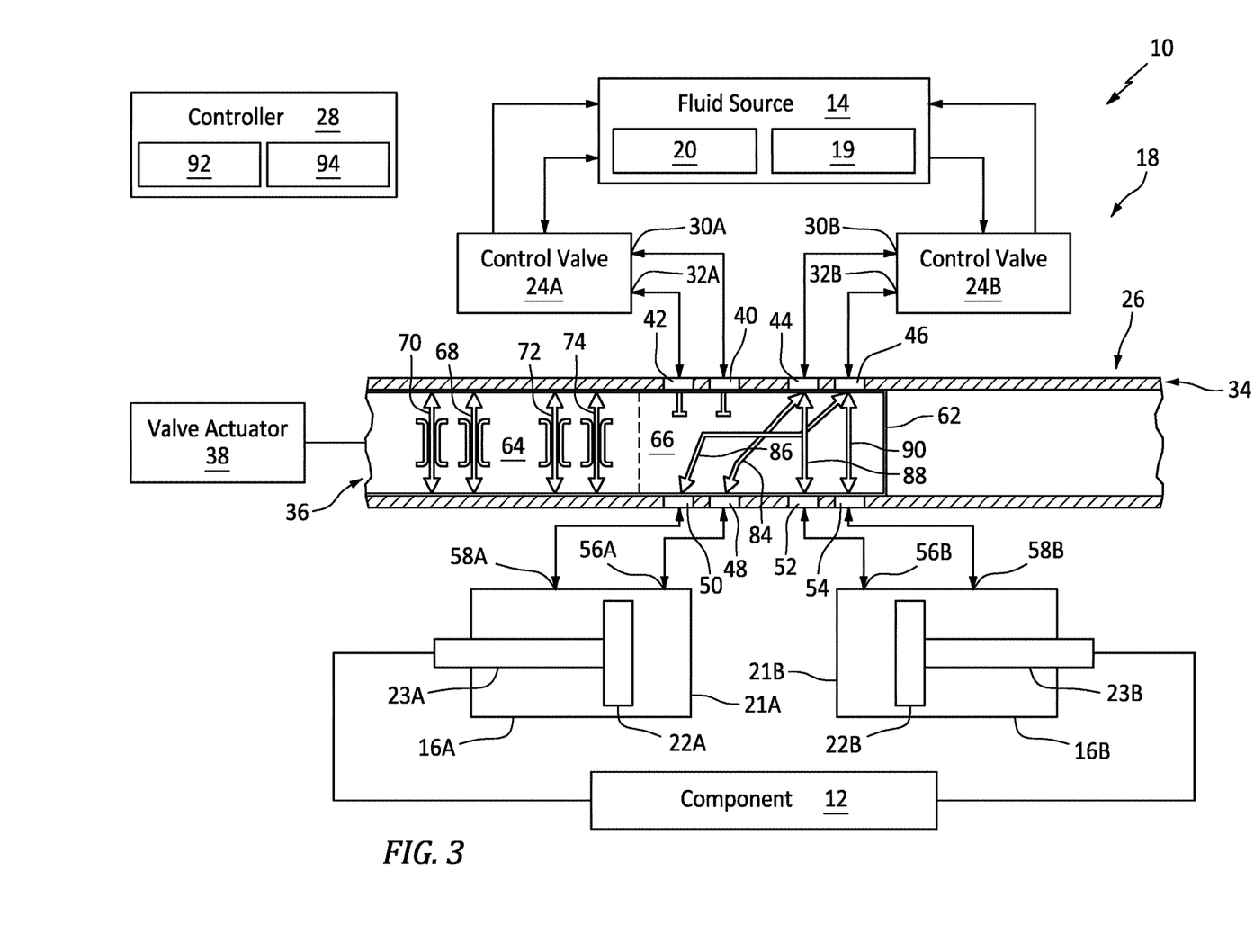

When the valve body 36 is in the second end position of FIG. 3, the transfer valve 26 fluidly couples the second control valve 24B to both the first fluid actuator 16A and the second fluid actuator 16B. Here, the first control valve 24A is fluidly decoupled from both the first fluid actuator 16A and the second fluid actuator 16B. More particularly, each first actuator passage 84, 86 in the second end station 66 is disposed between, may be aligned with and is fluidly coupled to a respective one of the second valve ports 44 and 46 and a respective one of the first actuator ports 48 and 50. Each second actuator passage 88, 90 in the second end station 66 is disposed between, may be aligned with and is fluidly coupled to a respective one of the second valve ports 44 and 46 and a respective one of the second actuator ports 52 and 54. The second control valve 24B may thereby control (e.g., regulate) fluid flow to and/or from and is dedicated to operation of both the first fluid actuator 16A and the second fluid actuator 16B.

The valve actuator 38 of FIGS. 1-3 is configured to move the valve body 36 within the valve housing 34 between its various positions. Examples of the valve actuator 38 include, but are not limited to, an electric solenoid and an electric motor.

The controller 28 of FIG. 1 is in signal communication (e.g., hardwired and/or wirelessly coupled) with the first control valve 24A, the second control valve 24B and the transfer valve 26 and its valve actuator 38. The controller 28 may be implemented with a combination of hardware and software. The hardware may include a memory 92 and at least one processing device 94, which processing device 94 may include one or more single-core and/or multi-core processors. The hardware may also or alternatively include analog and/or digital circuitry other than that described above.

The memory 92 is configured to store software (e.g., program instructions) for execution by the processing device 94, which software execution may control and/or facilitate performance of one or more operations such as those described below. The memory 92 may be a non-transitory computer readable medium. For example, the memory 92 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

The fluid system 10 and its transfer valve 26 may be operated in various modes of operation. For example, when both the first control valve 24A and the second control valve 24B are (e.g., fully) operational, the fluid system 10 and its transfer valve 26 may operate in a multi-valve mode of operation; e.g., a normal operating mode. During this multi-valve mode of operation, the valve actuator positions the valve body 36 at its intermediate position where each control valve 24A, 24B is dedicated to and controls operation of a respective one of the fluid actuators 16A, 16B. Under certain conditions, however, one of the control valves 24A and 24B may malfunction or otherwise no longer operate as intended (e.g., be stuck open, be stuck closed, etc.). Where the second control valve 24B is the non-operational control valve, the fluid system 10 and its transfer valve 26 may operate in a first single valve mode of operation; e.g., a first backup and/or emergency operating mode. During this first single valve mode of operation, the valve actuator 28 positions the valve body 36 at its first end position where the first control valve 24A controls operation of both the first fluid actuator 16A and the second fluid actuator 16B. The transfer valve 26 may thereby operationally bypass the (e.g., non-operational) second control valve 24B during the first single valve mode of operation. Similarly, where the first control valve 24A is the non-operational control valve, the fluid system 10 and its transfer valve 26 may operate in a second single valve mode of operation; e.g., a second backup and/or emergency operating mode. During this second single valve mode of operation, the valve actuator 38 positions the valve body 36 at its second end position where the second control valve 24B controls operation of both the first fluid actuator 16A and the second fluid actuator 16B. The transfer valve 26 may thereby operationally bypass the (e.g., non-operational) first control valve 24A during the second single valve mode of operation.

With the foregoing arrangement, the multi-station transfer valve 26 may facilitate redundant control for each of the fluid actuators 16 without requiring inclusion of a separate back-up control valve for each fluid actuator 16. However, when operating in the multi-valve mode of operation, each fluid actuator 16A, 16B may still be fine tuned and separately controlled by its respective dedicated control valve 24A, 24B. By contrast, a prior art system may include two separate electrohydraulic servo valves (EHSVs) dedicated to each fluid actuator, where one of the electrohydraulic servo valves is used as a backup to the other one of the electrohydraulic servo valves. The multi-station transfer valve 26 of the present disclosure may thereby reduce cost, weight and/or spatial requirements of the fluid system 10.

Figure 4:
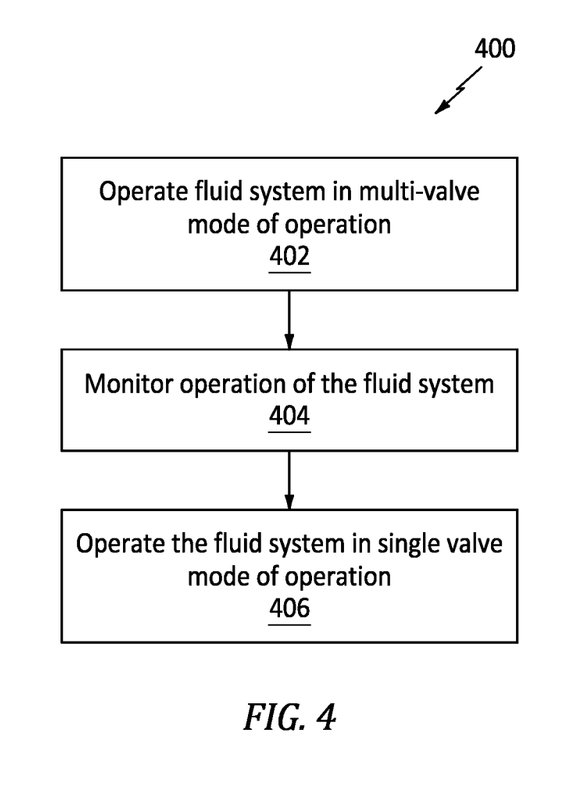
FIG. 4 is a flow diagram of a method for operating a fluid system.

FIG. 4 is a flow diagram of a method 400 for operating a fluid system. For ease of description, the operating method 400 is described below with reference to the fluid system 10 of FIGS. 1-3. The method 400 of the present disclosure, however, is not limited to operating such an exemplary fluid system.

In step 402, the fluid system 10 and its transfer valve 26 are operated in the multi-valve mode of operation. The controller 28 of FIG. 1, for example, may signal the valve actuator 38 to position the valve body 36 at its intermediate position. The controller 28 may also signal the first control valve 24A and the second control valve 24B to selectively flow fluid to and/or from the first fluid actuator 16A and the second fluid actuator 16B to move (or hold a position of) the moveable component 12.

In step 404, the controller 28 monitors operation of the fluid system 10. The controller 28, for example, may receive one or more sensor signals indicative of the operation of the control valves 24 and/or one or more sensor signals indicative of the operation of the fluid actuators 16. The controller 28 may then process data from the sensor signal(s) to determine if one or more of the control valves 24 is operating (e.g., opening, closing, holding its position, etc.) as expected. Where the control valves 24 are operating as expected, the fluid system 10 and its transfer valve 26 may continue to operate in the multi-valve mode of operation. However, where one of the control valves 24A, 24B is no longer operating as expected (e.g., the control valve 24A, 24B is non-operational, responding too slow, etc.), the operating method 400 may proceed to step 406.

In the step 406, the fluid system 10 and its transfer valve 26 are operated in one of the single valve modes of operation. For example, where it is determined the second control valve 24B is no longer operating as expected, the controller 28 may signal the valve actuator 38 to move the valve body 36 to its first end position of FIG. 2. The fluid system 10 may thereby operationally bypass the (e.g., non-operational) second control valve 24B and utilize the (e.g., operational) first control valve 24A to control operation of the first fluid actuator 16A and the second fluid actuator 16B. By contrast, where it is determined the first control valve 24A is no longer operating as expected, the controller 28 may signal the valve actuator 38 to move the valve body 36 to its second end position of FIG. 3. The fluid system 10 may thereby operationally bypass the (e.g., non-operational) first control valve 24A and utilize the (e.g., operational) second control valve 24B to control operation of the first fluid actuator 16A and the second fluid actuator 16B.

As described above, fluid flow through the transfer valve 26 may be restricted when the valve body 36 is in its intermediate position and operating in the multi-valve mode of operation. This restriction may limit an impact of fluid runaway if, for example, one of the control valves 24 malfunctions. However, fluid flow through the transfer valve 26 may be unrestricted when the valve body 36 is in its first and/or its second end position. The transfer valve 26 may thereby facilitate (e.g., full) operation of the first fluid actuator 16A and the second fluid actuator 16B even when regulated by the single control valve 24.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure.

Accordingly, the present disclosure is not to be restricted except in light of the attached claims and their equivalents.

What is claimed is:

1. A fluid system, comprising:
a first actuator;
a second actuator; and
a valve system including a first control valve, a second control valve and a transfer valve;
during a first mode of operation, the transfer valve configured to fluidly couple the first control valve to the first actuator and fluidly couple the second control valve to the second actuator, and the transfer valve further configured to fluidly decouple the first control valve from the second actuator and fluidly decouple the second control valve from the first actuator; and
during a second mode of operation, the transfer valve configured to fluidly couple the first control valve to the first actuator and the second actuator, and the transfer valve further configured to fluidly decouple the second control valve from the first actuator and the second actuator;
wherein a first station first passage in the transfer valve has a minimum flow area, and the first station first passage fluidly couples the first control valve to the first actuator during the first mode of operation; and
wherein a second station first passage in the transfer valve has a minimum flow area that is greater than the minimum flow area of the first station first passage, and the second station first passage fluidly couples the first control valve to the first actuator during the second mode of operation.

2. The fluid system of claim 1, wherein, during a third mode of operation, the transfer valve is configured to fluidly couple the second control valve to the first actuator and the second actuator, and the transfer valve is further configured to fluidly decouple the first control valve from the first actuator and the second actuator.

3. The fluid system of claim 1, wherein at least one of
the first actuator comprises a first piston actuator; or
the second actuator comprises a second piston actuator.

4. The fluid system of claim 1, wherein at least one of
the first control valve comprises a first electrohydraulic servo valve; or
the second control valve comprises a second electrohydraulic servo valve.

5. The fluid system of claim 1, wherein
a first station second passage in the transfer valve has a minimum flow area, and the first station second passage fluidly couples the second control valve to the second actuator during the first mode of operation; and
a second station second passage in the transfer valve has a minimum flow area that is greater than the minimum flow area of the first station second passage, and the second station second passage fluidly couples the first control valve to the second actuator during the second mode of operation.

6. The fluid system of claim 5, wherein at least one of
the minimum flow area of the first station second passage is equal to the minimum flow area of the first station first passage; or
the minimum flow area of the second station second passage is equal to the minimum flow area of the second station first passage.

7. The fluid system of claim 1, wherein
the first actuator including a first inlet/outlet orifice and a second inlet/outlet orifice; and
the transfer valve is configured to discretely fluidly couple the first inlet/outlet orifice and the second inlet/outlet orifice to the first control valve during the first mode of operation and the second mode of operation.

8. The fluid system of claim 1, wherein
the second actuator including a first inlet/outlet orifice and a second inlet/outlet orifice;
the transfer valve is configured to discretely fluidly couple the first inlet/outlet orifice and the second inlet/outlet orifice to the second control valve during the first mode of operation; and
the transfer valve is configured to discretely fluidly couple the first inlet/outlet orifice and the second inlet/outlet orifice to the first control valve during the second mode of operation.

9. The fluid system of claim 1, further comprising:
a fluid source;
the valve system fluidly coupling the fluid source to the first actuator and the second actuator.

10. The fluid system of claim 1, further comprising:
an aircraft component;
the first actuator and the second actuator operatively coupled to and configured to move the aircraft component.

11. A fluid system, comprising:
a first actuator; and
a valve system including a first control valve, a second control valve and a transfer valve;
the transfer valve including a first station first passage and a second station first passage, wherein a minimum flow area of the first station first passage less than a minimum flow area of the second station first passage;
during a first mode of operation, the transfer valve configured to fluidly couple the first control valve to the first actuator through the first station first passage; and
during a second mode of operation, the transfer valve configured to fluidly couple the second control valve to the first actuator through the second station first passage;
wherein the second control valve is fluidly decoupled from the first actuator during the first mode of operation, and the first control valve is fluidly decoupled from the first actuator during the second mode of operation.

12. The fluid system of claim 11, further comprising:
a second actuator;
the transfer valve further including a first station second passage and a second station second passage, wherein a minimum flow area of the first station second passage less than a minimum flow area of the second station second passage;
during the first mode of operation, the transfer valve configured to fluidly couple the second control valve to the second actuator through the first station second passage; and
during the second mode of operation, the transfer valve configured to fluidly couple the second control valve to the second actuator through the second station second passage;
wherein the first control valve is fluidly decoupled from the second actuator during the first mode of operation and the second mode of operation.

13. The fluid system of claim 12, wherein, during a third mode of operation, the transfer valve is configured to
fluidly couple the first control valve to the first actuator and the second actuator; and fluidly decouple the second control valve from the first actuator and the second actuator.

14. An operating method, comprising:

during a first mode, fluidly coupling a first control valve to a first actuator through a transfer valve, and fluidly coupling a second control valve to a second actuator through the transfer valve; and during a second mode, fluidly coupling the first control valve to the first actuator and the second actuator through the transfer valve, and fluidly decoupling the second control valve from the second actuator;

wherein flow through the transfer valve from the first control valve to the first actuator is restricted during the first mode; and wherein the flow through the transfer valve from the first control valve to the first actuator is unrestricted during the second mode.

15. The operating method of claim 14, further comprising:

selecting the first mode when the first control valve and the second control valve are each fully operational; and selecting the second mode when a fault is detected associated with the second control valve.

16. The operating method of claim 14, wherein the first control valve and the second control valve are each configured as an electrohydraulic servo valve.

17. The operating method of claim 14, further comprising moving a component of an aircraft using the first actuator and the second actuator during at least one of the first mode or the second mode.

* * * * *